(12) United States Patent
Moestrup et al.

(10) Patent No.: US 9,458,820 B2
(45) Date of Patent: Oct. 4, 2016

(54) WIND TURBINE NACELLE COVER AND A METHOD FOR INSTALLING A GENERATOR ON A MAINFRAME IN A NACELLE

(71) Applicant: Envision Energy (Denmark) ApS, Silkeborg (DK)

(72) Inventors: Henning Moestrup, Viborg (DK); Per Langfeldt, Hedensted (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 803 days.

(21) Appl. No.: 13/713,591

(22) Filed: Dec. 13, 2012

(65) Prior Publication Data

US 2013/0156560 A1 Jun. 20, 2013

(30) Foreign Application Priority Data

Dec. 16, 2011 (DK) ................................. 2011 70718

(51) Int. Cl.
*F03D 1/00* (2006.01)
*F03D 9/00* (2016.01)

(52) U.S. Cl.
CPC .............. *F03D 1/001* (2013.01); *F03D 9/002* (2013.01); *F03D 80/00* (2016.05); *F05B 2220/7066* (2013.01); *F05B 2240/14* (2013.01); *Y02E 10/722* (2013.01); *Y02E 10/725* (2013.01); *Y02E 10/726* (2013.01); *Y02E 10/728* (2013.01); *Y10T 29/49009* (2015.01)

(58) Field of Classification Search
CPC ........ F03D 11/00; F03D 9/002; F03D 1/001; F03D 1/003; F03D 1/005; Y02E 10/725; Y02E 10/726; Y02E 10/728; Y02E 10/722; Y10T 29/49009; F05B 2220/7066; F05B 2240/14

USPC ....................................................... 416/244 A
See application file for complete search history.

(56) References Cited

U.S. PATENT DOCUMENTS

| | | | | |
|---|---|---|---|---|
| 3,474,834 A | * | 10/1969 | Carey | F16L 9/00 138/140 |
| 4,527,072 A | * | 7/1985 | van Degeer | F03D 7/0224 290/55 |
| 4,560,176 A | * | 12/1985 | Hoff | F16J 15/184 277/505 |
| 5,785,591 A | * | 7/1998 | Payne | B65D 88/121 220/1.5 |
| 7,969,037 B2 | | 6/2011 | Segovia et al. | |
| 8,142,155 B2 | | 3/2012 | Numajiri et al. | |

(Continued)

FOREIGN PATENT DOCUMENTS

| | | |
|---|---|---|
| CN | 201125843 Y | 10/2008 |
| CN | 201696234 U | 1/2011 |
| EP | 2 063 119 A2 | 5/2009 |

*Primary Examiner* — Igor Kershteyn
*Assistant Examiner* — Aaron R Eastman
(74) *Attorney, Agent, or Firm* — David S. Safran (57) ABSTRACT

A wind turbine and to a method for installing a generator for a wind turbine, in which a nacelle and a mainframe for installation of, e.g., a generator and a main shaft, is installed on top of a tower. The nacelle further has a nacelle cover extending over the main frame from the hub and to a rear end, covering components installed on the main frame. The nacelle cover has at least a first part and a second part, the first part having a interface for engagement with a corresponding interface on the second part, the second part of the nacelle cover housing a generator as one unit. By having the generator and the second part of the nacelle cover as a single unit, installation can be performed in one go and then only one hoist with a crane is needed.

10 Claims, 9 Drawing Sheets

(56) References Cited

U.S. PATENT DOCUMENTS

| | | | | |
|---|---|---|---|---|
| 2009/0008880 A1* | 1/2009 | Bodmann | ............... | F16J 15/064 277/368 |
| 2009/0280010 A1* | 11/2009 | Pederson | ................... | B66F 3/46 416/1 |
| 2010/0043227 A1* | 2/2010 | Numajiri | ................ | B66C 1/108 29/889 |
| 2010/0071585 A1* | 3/2010 | Wright | ..................... | B61C 7/04 105/35 |
| 2011/0008147 A1* | 1/2011 | Lemos | ................... | F03D 1/005 414/800 |
| 2011/0024378 A1* | 2/2011 | Pleuss | ................... | B66C 13/18 212/276 |
| 2011/0076140 A1* | 3/2011 | Elsenheimer | ........... | F03D 1/001 415/200 |
| 2011/0132239 A1* | 6/2011 | Poulsen | ............. | B65D 19/0095 108/55.1 |
| 2011/0268541 A1* | 11/2011 | Poulsen | ................... | B65G 7/02 414/391 |

\* cited by examiner

WIND TURBINE NACELLE COVER AND A METHOD FOR INSTALLING A GENERATOR ON A MAINFRAME IN A NACELLE

BACKGROUND OF THE INVENTION

1. Field of the Invention

The present invention relates to a wind turbine and to a method for assembling and installing a generator for a wind turbine, said wind turbine comprising a nacelle, said nacelle being installed on top of a generally vertical tower, said nacelle comprising a mainframe suitable for installation of a number of components such as, e.g., a generator, a main shaft, and a hub comprising a number of blades, said nacelle further comprising a nacelle cover extending over said main frame from the hub and to a rear end, covering components installed on the main frame.

2. Description of Related Art

It is well known that a modern wind turbine in the Mega Watt class has a nacelle on top of a tower, where various components are arranged. An example of such a component is a generator that via a main shaft is connected to a rotor with a number of wind turbine blades. During installation of the wind turbine, a complete nacelle including all the components that have to be installed in said nacelle can be hoisted to the top of the tower and installed in one piece. As the wind turbines grow larger and larger over time such a nacelle is becoming quite heavy. A complete nacelle for, e.g., a modern 6 Megawatt wind turbine actually weighs more than 230 metric ton. Installing such a component requires use of very large cranes, which only can be operated at wind speeds below a certain value. Further large wind turbines are often installed offshore which also raises extensive and demanding requirements to the equipment used and to the wind speed and also to the size of the waves.

Due to the above mentioned conditions it often becomes expensive to install such wind turbines as it is very common that an installation must be postponed or stopped due to, e.g., wind and/or waves. The crane or cranes will then be on standby and awaiting better conditions. In order to overcome some of the disadvantages by having large cranes hoisting large and heavy components to the top of e.g., a 100 meter high tower, the components can be installed individually by smaller cranes and it might be possible to install some of the minor parts at higher wind speeds than when handling a complete nacelle. This—however—gives another challenge as the nacelle needs to be constructed in a manner that allows it to be opened, so the different components can be installed from above and onto the mainframe in the nacelle. If for any reason one of the components in the nacelle fails and need to be replaced, it is also necessary to get access to the nacelle. Thus, it is very common to have the nacelle cover put together from various parts designed so the nacelle cover can be opened, e.g., with the top of the cover attached to a hinge allowing the top to be swung to the side or simply by lifting and removing at least the top of the nacelle cover. This will give access to the nacelle, but still either of the known solutions is time consuming and expensive and extra work has to be carried out at the nacelle.

Such parts are normally bolted together, but until now the interfaces still allows for some rain water to access the nacelle which is highly unwanted.

One of the larger problems to solve when opening a nacelle cover, either by opening a hinged nacelle cover part or simply by removing a part of the nacelle cover, is to handle the rather large and lightweight items at perhaps 100 meters of height at a location with at least some wind.

Another problem is to design the nacelle cover, especially to design the interface between the respective nacelle cover parts in a manner that will keep rain water from entering the nacelle. This seems to be quite a problem and so far this problem has been addressed, but still no proper solution has been made.

SUMMARY OF THE INVENTION

It is an object of the invention to provide a wind turbine nacelle cover and a method for installing a generator on a mainframe in a nacelle, where the installation can be carried out in a single, relatively fast and simple process which can reduce installation time or downtime in relation to repair or replacement of a generator.

DESCRIPTION OF THE INVENTION

As mentioned above, the invention relates to a wind turbine comprising a nacelle, said nacelle being installed on top of a generally vertical tower, said nacelle comprising a mainframe suitable for installation of a number of components such as, e.g., a generator, a main shaft, and a hub comprising a number of blades, said nacelle further comprising a nacelle cover extending over said main frame from the hub and to a rear end, covering components installed on the main frame.

The nacelle cover according to the invention comprises at least a first part and a second part, said first part having an interface for engagement with a corresponding interface on said second part, where said second part of the nacelle cover is housing a generator, and where said generator and said second part of a nacelle cover is construed as one unit. By having the generator and the second part of the nacelle cover as a single unit, installation can be done in one go and then only one hoist with a crane is needed which will provide an economical benefit, but it will also make it possible to do the installation in a more narrow time window in relation to the wind conditions and a weather forecast. Thus an installation of a generator and the corresponding nacelle cover can be performed in one single working procedure.

The nacelle cover as such can be manufactured in various ways, but typically it is made from in a fiber reinforced composite material, but it can also be manufactured in steel or other types of metal or in combinations of metal and composite material. By constructing the nacelle cover in parts, where at least the parts arranged around a generator has an interface corresponding to an interface on the abutting nacelle cover parts, it becomes an option to install said nacelle cover parts on the ground either at the erection site of the wind turbine, but preferably at a production or installation facility where the work can be carried out in a safe and cost effective manner.

According to the invention, a generator already fitted with a cover—a part of the nacelle cover—is hoisted to the mainframe of said nacelle which preferably is fitted with one or more nacelle cover parts, and then installed at the mainframe/nacelle. The cover parts are, as mentioned, designed with an interface which allows for a quick and simple joining of the parts in question.

The invention further comprises a method for assembling and installing a generator unit for a wind turbine on a mainframe in a nacelle, as mentioned in the introduction.

A method according to the invention may comprise the steps of installing a generator unit at a mainframe suitable for installation of further components such as a shaft and a hub, said shaft being directly or indirectly connected to the hub, where said nacelle comprises a nacelle cover and said generator unit comprises at least a generator having a stator and a rotor, said stator having connection means for connection to said mainframe, and said rotor having connection means for connection to said shaft. The method according to the invention may even further comprise the steps of:

- installing a first/central nacelle cover part at said main frame
- providing the generator with installation means,
- covering said generator with a second/rear part of a nacelle cover part, said generator and second/rear nacelle cover part thus forming a single generator unit,
- hoisting said generator unit to the main frame,
- installing said generator unit at the main frame and at the same time installing said second/rear nacelle cover part to said first/central nacelle cover part via their corresponding interfaces.

By the method according to the invention, a cost effective and quick installation can be performed where expensive crane time is minimized and where only a minimum of installation work has to take place at the nacelle in e.g. 100 meters of height, e.g., is installation of the nacelle cover not to be carried out after installation of the generator.

In a preferred embodiment of a wind turbine according to the invention is at least one of the nacelle cover parts on its interface part provided with at least one flexible sealing lip, preferably a resilient rubber part, said flexible sealing lip extending in a substantially radial direction from one nacelle cover part to another nacelle cover part. By having such a resilient and/or flexible sealing lip, it is possible to keep rain water from entering the nacelle at the interface between the said nacelle cover parts. As wind turbines often are erected in areas with good wind condition, it becomes necessary to design all of the components of a wind turbine to be able to resist the conditions or to cover the components as done in a nacelle. By providing at least one of the nacelle cover part with sealing means e.g. one or more sealing lips, rain water and also wind can be prohibited from entering the nacelle through the interface between the nacelle cover parts. This way components such as e.g. the generator and/or electrical components may be protected from being damaged by entering rain water or wind.

The sealing lips can be made from different materials as long at the sealing lip is flexible and capable of adjusting its shape according to the shape of the corresponding interface parts. Further the material has to be stiff enough to keep the shape and flexibility. Such a sealing lip can be made from rubber, or e.g., from neoprene that has the needed properties and is able to withstand the harsh environment such as, e.g., rain water, wind and UV radiation from the sun.

By retracting the flexible sealing lip away from the outer most edge of the interface between the nacelle cover parts, it can be protected against most of the environmental elements, and if the sealing lips are situated in a location where also a drain and perhaps also a second sealing lip and a second drain is arranged, a very safe and perfect double sealing can be obtained. This will be discussed in more detail in the detailed description, and it will be shown in the figures.

In an embodiment of a wind turbine according to the invention, said unit comprising a generator in said second part of the nacelle cover, may further comprise installation means, where said installation means are either an integrated part of the generator or comprise one or more separate parts fixed to said generator, where said installation means comprise means for hoisting said unit. A generator can preferably be constructed in a manner where such means for hoisting are embedded or incorporated in the structure, but said means for installation may also consist of steel beams or structures that are installed, e.g., by bolting or welding to the generator parts. As the installation means either are integrated or fixed to the generator, said means can stay on the generator after installation. By having the installation means on the generator at all times, both installation and, e.g., a later exchange of a generator due to repair or upgrade can easily be performed in one single hoist.

In a preferred embodiment of a wind turbine according to the invention, said second part of the nacelle cover further comprises at least one hatch, said at least one hatch being arranged above means for hoisting said unit. Having one, two, three or perhaps four or more hatches on the nacelle cover that houses the generator at the locations where the above mentioned installation means are situated allows for access to specially designed and placed lifting lugs or connection points for the hoisting equipment. By using lifting lugs or other means for hoisting the unit, it becomes more easy to maneuver the unit as the lifting lugs or connection points can be placed according to the unit's center of gravity in a manner that allows the unit to be hoisted and hanging with the interface of the nacelle cover and the interface of the generator in a predetermined angle. It is to be understood that a hatch as mentioned above can have a size of, e.g., 1 meter by 1 meter, but that it also can be smaller or larger. Between a hatch and the nacelle cover there will be arranged appropriate sealing means and after installing the unit onto the mainframe the hatches will be closed.

A wind turbine according to the invention may have said interface on the first and second part of the nacelle cover arranged at an angle between 0 and 90 degrees to horizontal.

In a preferred embodiment of the invention, said interface on the first and second part of the nacelle cover is substantially vertical corresponding to 90 degrees more or less. By having the interface with such a direction, installation of the unit becomes simpler as the unit can be brought into position at the right height and then moved in a horizontal direction, e.g., by swinging the crane and thus bringing both the nacelle cover parts and the generator into its final position.

In yet a preferred embodiment of a wind turbine according to the invention, said first part of a nacelle cover can be a central part and the second part of the nacelle cover can be a rear part of said nacelle cover, where the interface on the second/rear part is smaller than the interface of the first/central part of the nacelle cover, thus allowing the second interface to be installed inside the first interface where sealing means are arranged on the circumference of the second interface on the second/rear part and where said sealing means are abutting the first interface on the first/central part. By such a solution there is a general deflection of rain water and wind by the design of the interfaces and then a sealing as described above and as will be described in more detail in the detailed description and in the figures.

In a preferred method for assembling a generator unit and for installing such a generator unit according to the invention, said method can at least and further comprise the steps of:

- providing an installation stand comprising at least a foot part and a fixture for fixation of the installation stand to the stator of said generator, allowing said generator to be positioned with a distance to the ground,
- fixating said generator to said installation stand,
- providing the generator with installation means,
- installing a second/rear part of a nacelle cover part over said generator, transporting said generator unit on said installation stand to a storage or to an erection site for a wind turbine,
connecting hoisting means to said generator unit,
relieving the load on the installation stand by hoisting the generator unit from the ground,
dismounting the installation stand from the generator,
hoisting to and installing said generator unit at a mainframe in a nacelle on a wind turbine.

By using this method, it is possible to assemble the generator at e.g. a factory floor while it is clear of the ground, making it possible to access the generator from all sides. Only the side with the flanges for connection to the mainframe and to the shaft of the wind turbine is not completely free, but only partly accessible due to the installation stand. It is also possible to install the nacelle cover part on the generator.

By letting the fully assembled generator unit stay fixated to the installation stand, it can also be used during storage and/or transport. Further there is only a need to wrap the interface end of the generator unit as the nacelle cover part does the job on the unit as such, which is a great advantage compared to the known solutions, where the generator is wrapped up for transport.

A unit as discussed above can, e.g., have a weight of 150 metric ton or more and can e.g. have a diameter of 5 to 8 meters or even more. It is thus a quite big unit to manoeuvre into a very precise position, where the acceptable tolerances are a very few millimeters or even less than 1 millimeter. This invention makes it possible to install such a wind turbine with such a unit comprising a generator and a nacelle cover, where the unit is to be installed at a mainframe in a nacelle on top of a tower of a wind turbine.

DESCRIPTION OF THE DRAWING

An embodiment of the invention will now be described, by way of example only, with reference to the accompanying drawings, in which.

BRIEF DESCRIPTION OF THE DRAWINGS

DETAILED DESCRIPTION OF THE INVENTION

Figure 1:
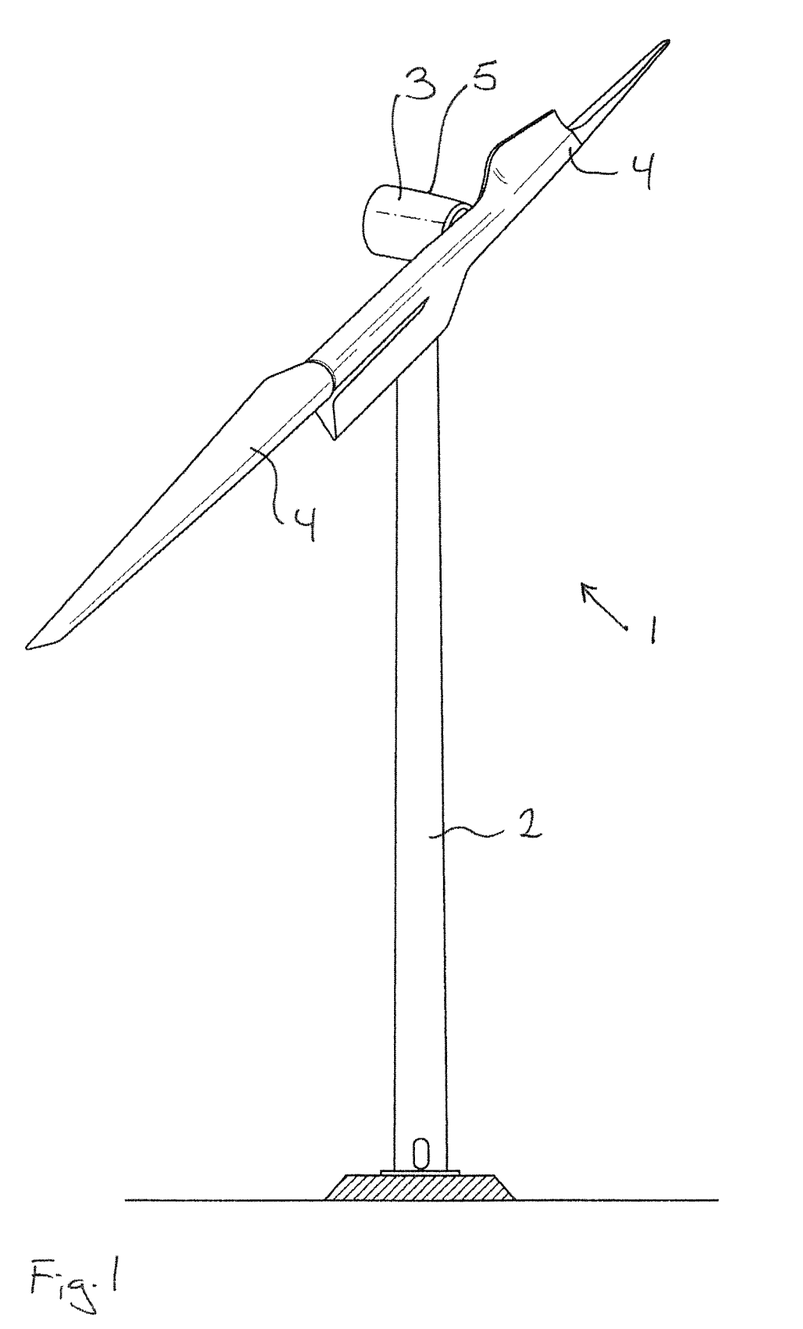
FIG. 1 shows a two bladed wind turbine.

In the following text, the figures will be described one by one and the different parts and positions seen in the figures will be numbered with the same numbers in the different figures. Not all parts and positions indicated in a specific figure will necessarily be discussed together with that figure.
Position Number List
1 Wind turbine
2 Wind turbine tower
3 Nacelle
4 Blade
5 Nacelle cover
6 Hub/spinner
7 Rotatable shaft
8 Generator
9 Hatch
10 Cooler/radiator
11 Toothed rim
12 Mainframe
13 Stationary shaft
14 First/center part of the nacelle cover
15 Second/rear part of the nacelle cover
16 Crane
17 Hoisting wires
18 Lifting lug
19 Generator unit
20 Interface on the second/rear part of the nacelle cover
21 Corresponding interface on the first/center part of the nacelle cover
22 Sleeve on center part of the nacelle cover
23 Stub end on rear part of the nacelle cover
24 First flexible and elastic sealing means
25 First flange on rear part of the nacelle cover
26 Fastening means
27 Second flexible and elastic sealing means
28 Second flange on rear part of the nacelle cover
29 Stator
30 Rotor
31 Horizontal installation means
32 Vertical installation means
33 Stator flange
34 Rotor flange
35 Installation stand
36 Back on installation stand
37 Foot on installation stand In FIG. 1 a typical two bladed wind turbine 1 comprising a wind turbine tower 2, a nacelle 3, and two blades 4 is seen. The nacelle 3 and/or the nacelle cover 5 are housing a not shown generator and other components, also not shown, of the wind turbine 1. Said components and also the nacelle cover 5, or at least parts of it, is fixed to a not shown main frame at the top of the wind turbine tower 2.

Figure 2:
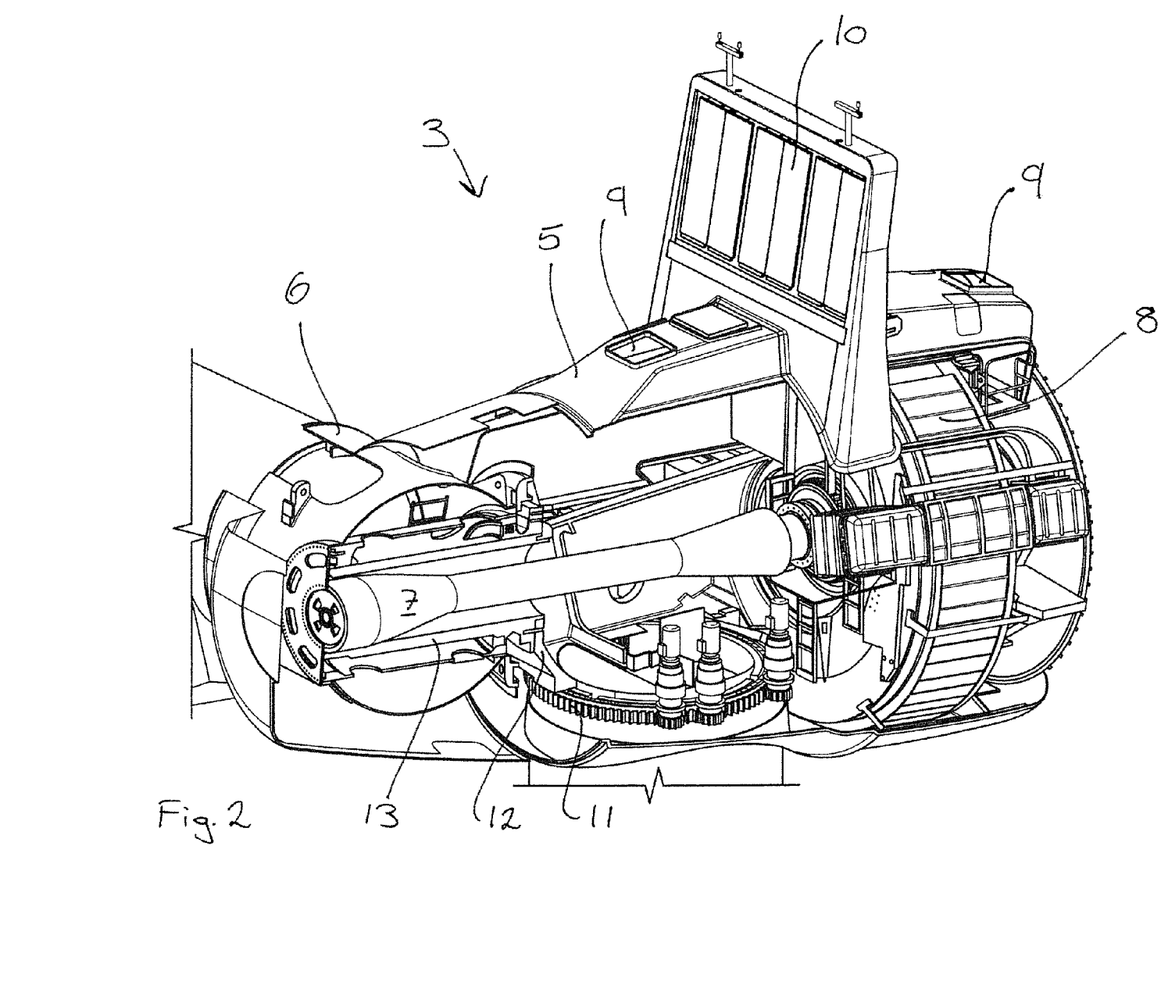
FIG. 2 shows a nacelle.

FIG. 2 shows a nacelle 3 comprising a lot of different components that are protected against the environmental elements by the nacelle cover 5. At one end of the nacelle 3 a hub/spinner 6 is seen, where unillustrated blades 4 would be installed for rotating a shaft 7 between the hub/spinner 6 and the generator 8. The figure further depicts a nacelle cover 5 with a number of hatches 9 for accessing the nacelle cover 5. On top of the nacelle 3 a cooler/radiator 10 is situated and at the bottom of the nacelle 3 a toothed rim 11 on a bearing is seen between the mainframe 12 and the wind turbine tower 2. In FIG. 2 it can be seen that the shaft 7 only is transmitting the torque generated by the blades 4 to the generator 8, and that the hub 6 is carried on a projecting stationary shaft 13 bolted to the main frame 12.

Figure 3:
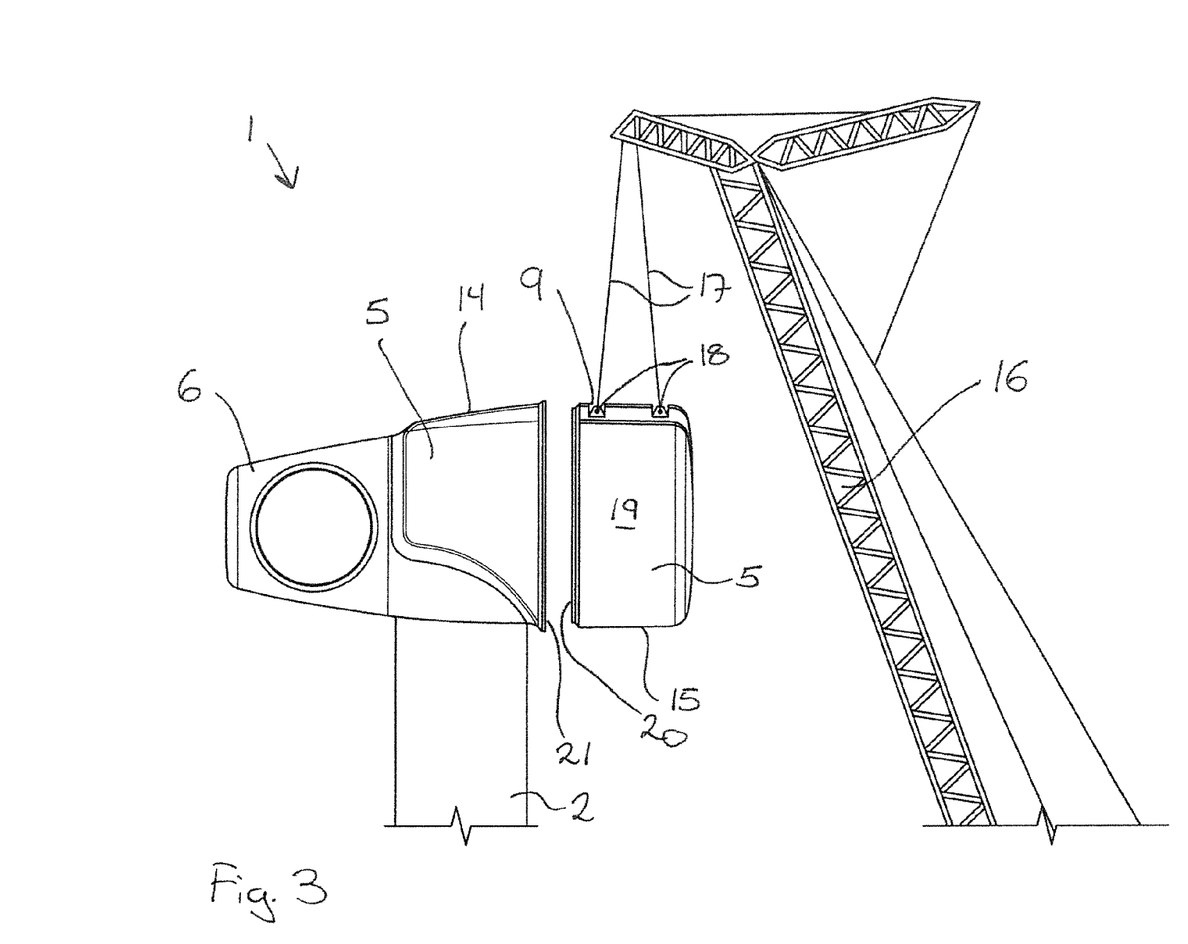
FIG. 3 shows the top of a wind turbine during installation of a part of the nacelle.

FIG. 3 shows the top of a wind turbine 1, where a first/center part 14 of the nacelle cover is installed at the mainframe on top of the wind turbine tower 2. The second/rear part 15 is being hoisted by a crane 16 for installation at the not shown mainframe 12. The crane 16 is via hoisting wires 17 connected to lifting lugs 18 at the generator 8 through hatches 9 in the second/rear part 15 of the nacelle cover 5. In FIG. 3, the unit 19 comprising the generator 8 and the second/rear part 15 of the nacelle cover 5 is in position at the installation height and only a short horizontal movement of the unit 19 is needed. On the second/rear part 15 of the nacelle cover 5, the interface 20 of said second/rear part 15 is seen facing the corresponding interface 21 of the first/center part 14 of the nacelle cover 5. By moving the unit 19 and thus the second/rear part 15 of the nacelle cover 5 towards the first/center part 14 of the nacelle cover 5, the interface 20 will be brought into contact with the corresponding interface 21, and when the unit 19 is in position at the mainframe 12, the nacelle cover 5 is also in position. After having installed the generator 8 to the mainframe 12, the hoisting wires 17 are disconnected and the hatches 9 over the lifting lugs 18 are closed. It is now clear that the generator 8 and the rear part 15 of the nacelle cover 5 are installed as a single unit 19, where practically all components are installed at said unit 19 before hoisting and preferably before said unit enters the erection site of the wind turbine 1.

Figure 4:
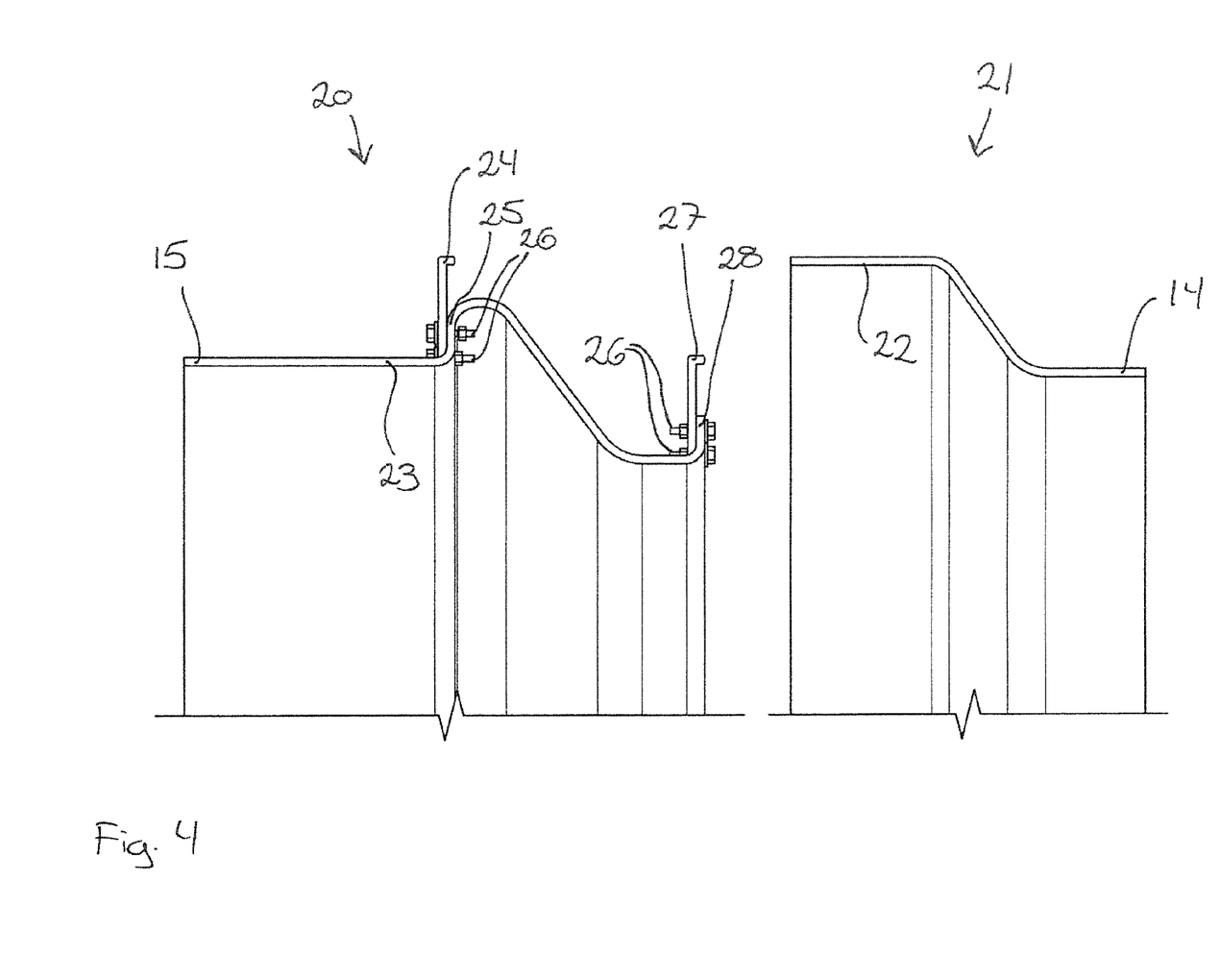
FIG. 4 shows details of the interface of two separated nacelle cover parts.

FIG. 4 shows details of the interface 20, 21 of two separated nacelle cover parts 14, 15. The center part 14 has a sleeve 22 designed to accommodate a corresponding stub end 23 of the rear part 15 of the nacelle cover 5. On the inside of the sleeve 22 there is a smooth surface and on the outer surface of the stub end 23 there is arranged a first flexible and elastic sealing means 24, on a first flange 25 with suitable fastening means 26. Further there is arranged a second flexible and elastic sealing means 27 on a second flange 28 also with suitable fastening means 26. Both the first and the second flexible and elastic sealing means 24, 27 are designed to come into contact with the inner surface of the sleeve 22, when the first/center part 14 and second/rear part 15 are in a installed position.

Figure 5:
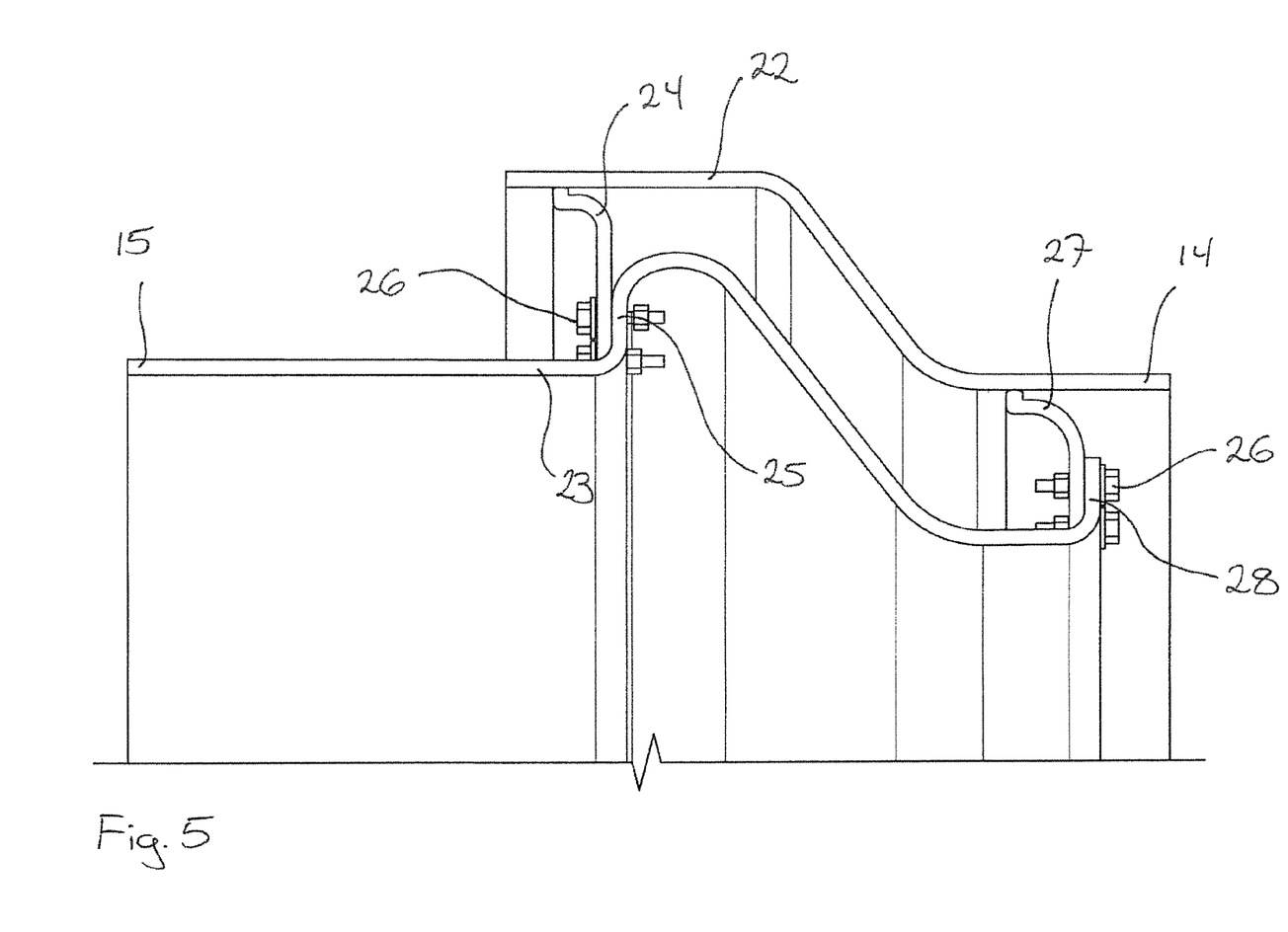
FIG. 5 shows details of the interface of two joined nacelle cover parts.

FIG. 5 shows details of the interface 20, 21 of two correctly joined or installed nacelle cover parts 14, 15. The details are from the top of the nacelle cover 5, but the same design can without any changes be used on the complete circumference of the nacelle cover 5. By having the first flexible and elastic sealing means 24 e.g. a ring manufactured from rubber, a simple and sturdy sealing is obtained, which will prevent rain water and also wind and dust from entering the nacelle 3 at the interface 20, 21. If by accident water should find way past the first sealing means 24, it will have to be forced over the first flange 25 and also past the second sealing means 27 and over the second flange 28. This design of the overall sealing between the first/center part 14 and the second/rear part 15 of the nacelle cover 5 is sturdy and redundant.

Figure 6:
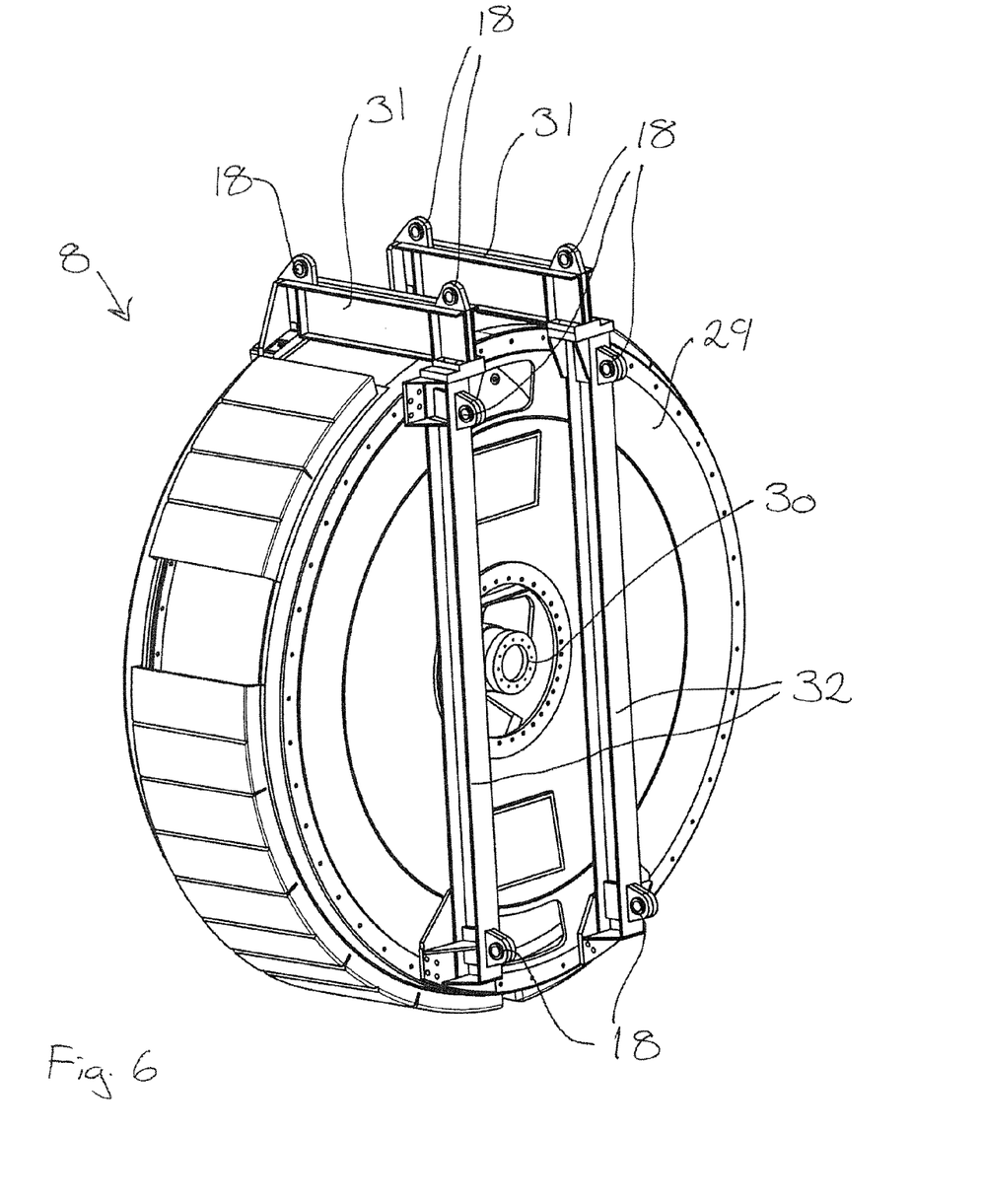
FIG. 6 shows a generator with installation means.

FIG. 6 shows a generator 8 with horizontal installation means 31 on top of the generator 8 and with vertical installation means 32 along the rear end of the generator 8. The installation means 31, 32 is fixed to the stator 29 and comprises a number of lifting lugs 18 allowing the generator 8 to be hoisted in a controlled manner and also to be positioned very precisely due to the lifting lugs 18 being positioned strategically. Thus it is possible to steer the generator 8 into position by not shown steering wires that can be attached to the lifting lugs 18. When the generator 8 is installed at the nacelle 3 on the mainframe 12, the installation means 31, 32 will stay on the generator 8. Leaving the installation means 31, 32 makes sense as a lot of time and expenses will be saved and further time and expenses will be saved if a repair or upgrade of the generator 8 has to take place at a later stage.

Figure 7:
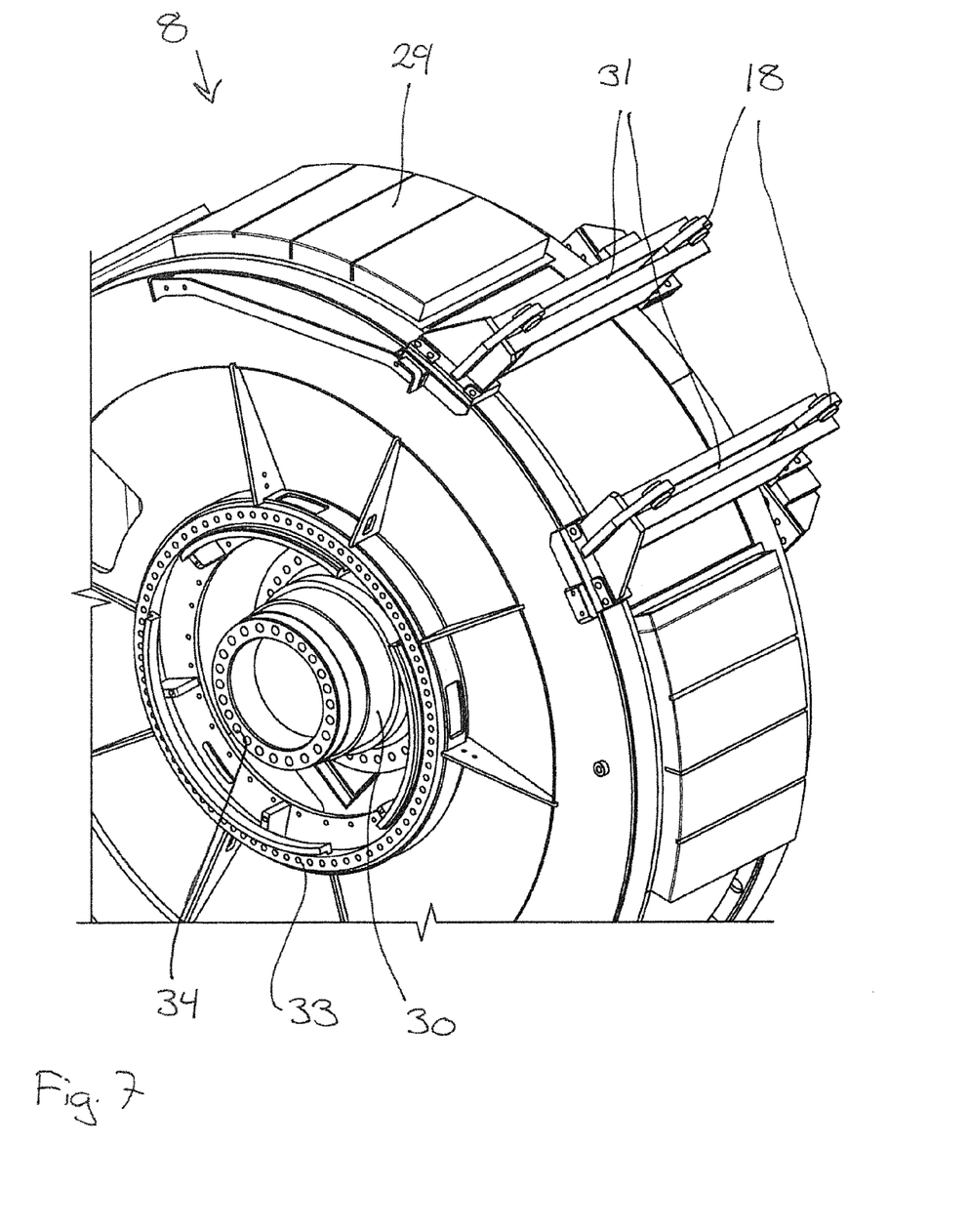
FIG. 7 shows a generator with installations means from a different angle.

FIG. 7 practically shows a generator 8 as seen in FIG. 6, with installations means 31, 32 but in a different angle. Here the rotor 30 is seen inside the stator 29 and also the stator flange 33 for connection to the mainframe 12 and the rotor flange 34 for connection to the shaft 7 are seen.

Figure 8:
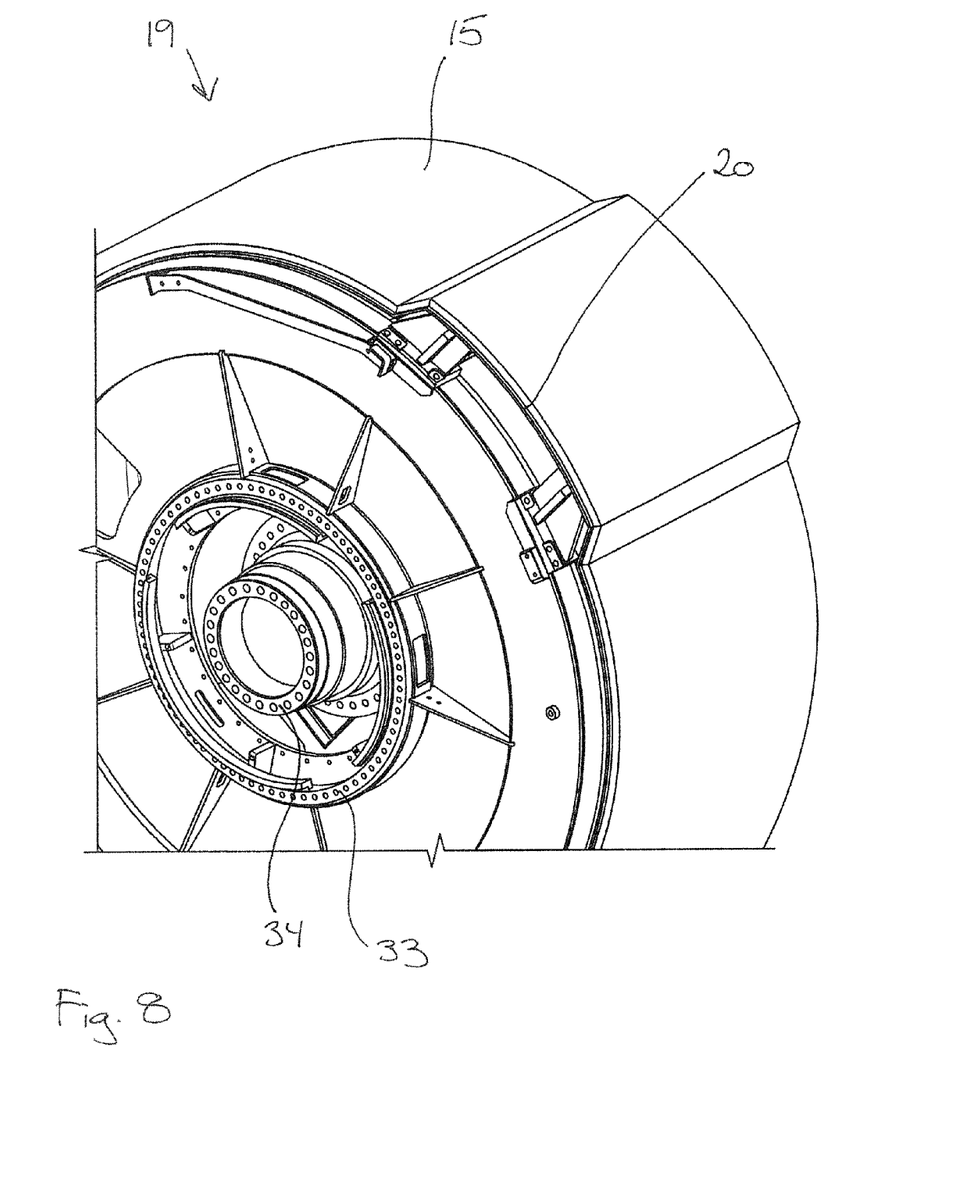
FIG. 8 shows a unit comprising a part of a nacelle cover and a generator.

FIG. 8 shows the rear part 15 of a nacelle cover 5 with a generator 8 as a unit 19 that can be put together on the ground prior to hoisting and that can be installed in one single hoist and that can be installed at the nacelle 3 as a unit simply by bolting the flanges 33, 34 of the stator 29 and the rotor 30 to the respective parts.

Figure 9:
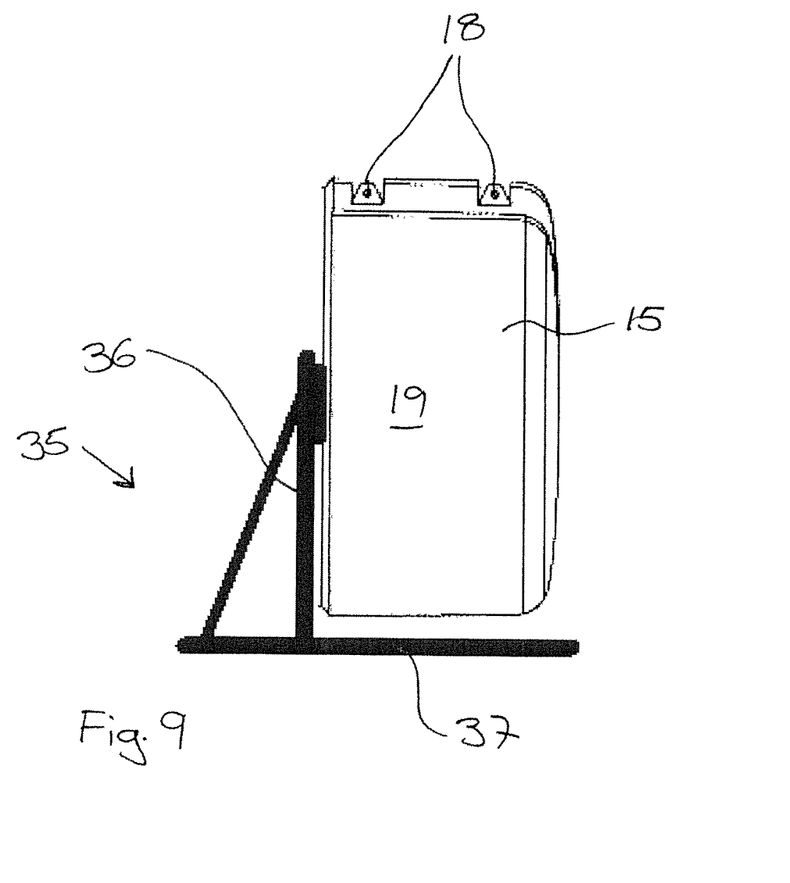
FIG. 9 shows a generator unit on an installation stand.

Finally FIG. 9 shows a generator unit 19, comprising a not seen generator 8 covered by a rear part 15 of a nacelle cover 5. Further this figure shows an installation stand 35, having a substantially L-shape with a back part 36 comprising not seen fixating means for fixating to a generator e.g. at the flange for connection the generator to the main frame 12. The installation stand 35 further comprises a foot 37 for engagement with the ground or a floor. When the generator unit 19 is assembled, only the interface facing towards the mainframe 12 when installed needs to be wrapped up or covered during storage and transport, which can be taken care of by ordinary packaging means. The open interface side of the generator unit can, e.g., be covered with a hood as known from covering the ends of tower segments, root ends on blades and from covering other items.

The invention is not limited to the embodiments described herein, and may be modified or adapted without departing from the scope of the present invention as described in the patent claims below.

What is claimed is:

1. A wind turbine comprising a nacelle, said nacelle being installed on top of a generally vertical tower, said nacelle comprising a mainframe suitable for installation of a number of components including a generator, a main shaft, and a hub comprising a number of blades, said nacelle further comprising a nacelle cover extending over said main frame from the hub and to a rear end, covering said number of components installed on the mainframe, wherein said nacelle cover comprising at least a first part and a second part, said first part having an interface for engagement with a corresponding interface on said second part, where said second part of the nacelle cover is housing a generator, and where said generator and said second part of a nacelle cover is construed as one unit, wherein said first part of the nacelle cover is a central part and the second part of the nacelle cover is a rear part, wherein the corresponding interface on the second part is smaller than the interface of the first part, thus enabling the corresponding interface to be installed inside the interface of the first part with a clearance space therebetween, and wherein sealing means are arranged extending between an outer circumference of the corresponding interface on the second part and an inner circumference of the interface of the first part at an axial distance from an edge at an axial end of the interface of the first part when installed, wherein said corresponding interface on the second part comprises a stub end and where said interface of the first part comprises a sleeve for accommodation of said stub end, the second part at said corresponding interface further comprises at least one flange extending towards the sleeve when installed, wherein said sealing means are arranged on the at least one flange and is configured to contact an inner surface of the sleeve, and wherein said clearance space extends axially from said flange along an area of spaced overlap between the interfaces of the first and second parts.

2. The wind turbine according to claim 1, wherein said sealing means comprises at least one flexible sealing lip on the interface of at least one of the first and second parts, said at least one flexible sealing lip extending in a substantially radial direction from one of the first and second parts to the other of the first and second parts.

3. A wind turbine according to claim 2, wherein said at least one flexible sealing lip is a resilient rubber part.

4. The wind turbine according to claim 1, wherein that said one unit further comprises installation means, where said installation means are either an integrated part of the generator or comprises one or more separate parts fixed to said generator, where said installation means comprise means for hoisting said one unit.

5. The wind turbine according to claim 4, wherein that said second part of the nacelle cover further comprises at least one hatch, said at least one hatch being arranged above said means for hoisting said one unit.

6. The wind turbine according to claim 1, wherein the second part at said corresponding interface comprises at least one second flange extending towards the sleeve when installed, wherein second sealing means is arranged on the at least one second flange and is configured to contact an inner surface of the sleeve.

7. A method for assembling a generator unit and for installing such a generator unit on a wind turbine on a mainframe in a nacelle, said nacelle and mainframe being installed on top of a generally vertical tower, said mainframe being suitable for installation of a number of components including a shaft and a hub, said shaft being directly or indirectly connected to said hub, where said hub comprises a number of blades, further said nacelle comprises a nacelle cover and said generator unit comprises at least a generator having a stator and a rotor, said stator having connection means for connection to said mainframe, and said rotor having connection means for connection to said shaft, and said nacelle cover comprising at least a first part and a second part, said first part having an interface for engagement with a corresponding interface on said second part, wherein that said method for assembling and installing a generator unit at least comprises the steps of:

installing the first part of the nacelle cover at said main frame     providing the generator with installation means,     covering said generator with the second part of the nacelle cover, said generator and second part thus forming a single generator unit,     hoisting said generator unit to the mainframe,     installing said generator at the mainframe and at the same time installing said second part to said first part by installing the corresponding interface of the second part inside the interface on the first part with a clearance space therebetween, wherein said corresponding interface on the second part comprises a stub end and where said interface of the first part comprises a sleeve for accommodation of said stub end, the second part at said corresponding interface further comprises at least one flange extending towards the sleeve, and wherein sealing means are arranged extending radially between an outer circumference of the corresponding interface on the second part and an inner circumference of the interface of the first part at an axial distance from an edge at an axial end of the interface of the first part, the sealing means are arranged on the at least one flange, said sealing means being brought into contact an inner surface of the sleeve during installing of the second part to said first part.

8. The method for assembling a generator unit and for installing such a generator unit according to claim 7, wherein said method at least and further comprises the steps of:

providing an installation stand comprising at least a foot part and a fixture for fixation of the installation stand to the stator of said generator, allowing said generator to be positioned with a distance to a ground,     fixating said generator to said installation stand in an upright position,     providing the generator with installation means,     installing the second part of the nacelle cover over said generator,     transporting said generator unit on said installation stand to a storage or to an erection site for the wind turbine,     connecting hoisting means to said generator unit,     relieving the load on the installation stand by hoisting the generator unit from the ground,     dismounting the installation stand from the generator,     hoisting to and installing said generator unit at the mainframe in the nacelle on the wind turbine.

9. The method for assembling a generator unit and for installing such a generator unit according to claim 8, wherein said step of hoisting said generator unit further comprises:

hoisting said generator unit to an installation height at the mainframe of the wind turbine using hoisting equipment,     aligning said generator unit in relation to the mainframe, and aligning the corresponding interface of said second part so that it is facing the interface of the first part,     performing a mainly horizontal movement of the generator unit towards the mainframe until it is in a final position at the mainframe, and thus bringing sealing means arranged on a stub end of the corresponding interface into contact with a sleeve of the interface.

10. The method for assembling a generator unit and for installing such a generator unit according to claim 7, wherein said step of hoisting said generator unit further comprises:

hoisting said generator unit to an installation height at the mainframe of the wind turbine using hoisting equipment,     aligning said generator unit in relation to the mainframe, and aligning the corresponding interface of said second part so that it is facing the interface of the first part,     performing a mainly horizontal movement of the generator unit towards the mainframe until it is in a final position at the mainframe, and thus bringing sealing means arranged on a stub end of the corresponding interface into contact with a sleeve of the interface.

* * * * *